R. H. PILCHER.
RAILROAD CROSSING.
APPLICATION FILED NOV. 30, 1910.
994,689.
Patented June 6, 1911.
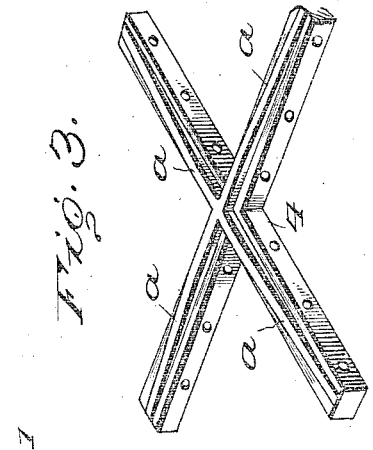
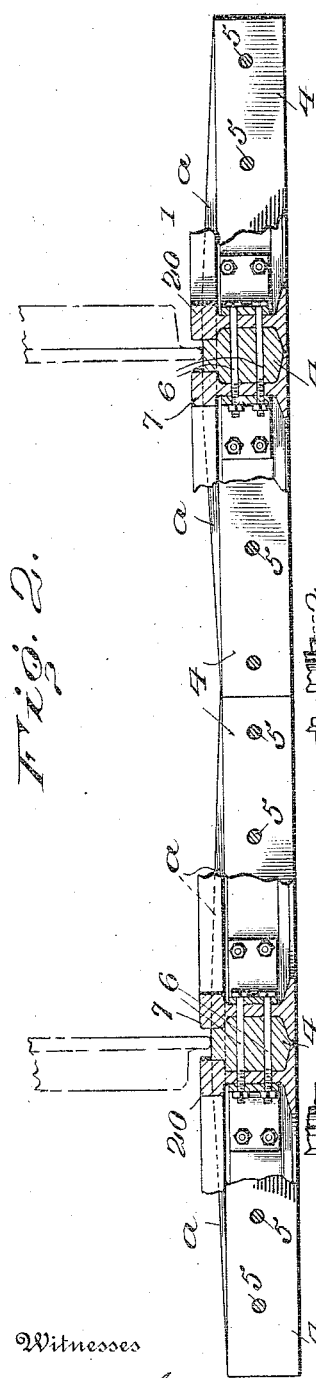

UNITED STATES PATENT OFFICE.

ROBERT H. PILCHER, OF DECATUR, ILLINOIS.

RAILROAD-CROSSING.

994,689.   Specification of Letters Patent.   Patented June 6, 1911.

Application filed November 30, 1910. Serial No. 595,001.

*To all whom it may concern:*

Be it known that I, ROBERT H. PILCHER, citizen of the United States, residing at Decatur, in the county of Macon and State of Illinois, have invented certain new and useful Improvements in Railroad-Crossings, of which the following is a specification.

This invention relates to certain improvements in railway crossings; and the objects and nature of the invention will be readily understood by those skilled in the art in the light of the following explanation of the accompanying drawings showing what I now consider my preferred embodiment from among other formations and arrangements within the spirit and scope of my invention.

An object of the invention is to provide certain improvements in railroad crossings designed to eliminate the hammering of the wheels when passing over the breaks in the rails of the crossings now in general use, and consequently to reduce the noise and wear and tear on equipment incidental to the passage of trains over such common crossings.

The invention consists in certain novel features in construction and in combinations and arrangements as more fully and particularly set forth hereinafter.

Referring to the accompanying drawings;—Figure 1, is a plan view of a railroad crossing constructed in accordance with my invention. Fig. 2, is a cross section on an enlarged scale. Fig. 3, is a detail perspective view, on a reduced scale, of one of the base plates provided with wheel flange treads or rails.

In the drawings, I show my invention adapted to two railroad tracks crossing each other at right angles although it is obvious that the invention can be adapted to tracks crossing at various angles.

The particular feature of my invention is to provide a crossing so formed and arranged as to lift the wheels of the passing trains from the rails and to support the same over the crossing by the wheel flanges traveling on unbroken track or tread surfaces continuous from one end or side of the crossing to the other. To this end, a suitable rigid strong bed or base is provided to which the rails of the intersecting railroad tracks are secured and along which they are carried to continue each track from one side of the crossing to the other. This bed is provided with elevated treads or track surfaces for each railroad track beside the rails thereof and parallel therewith and continuous from one side of the crossing to the other, for engagement by the wheel flanges, and whereby the wheel treads will be elevated from the rails and the wheels will be supported by their flanges over and beyond the crossing whereupon the wheels will be lowered to normal position on the track rails.

In the drawings, 1, are the rails of one track, and 2, are the rails of the other or intersecting track, and 10, and 20, are, respectively, the rail langths forming continuations thereof across the crossing, and leaving the breaks or spaces for the passage of wheels over the crossing on either track.

In the specific example illustrated, the crossing bed or base is composed of four similar spider frame castings or strong heavy metal bodies 4, such as shown by Fig. 3. Each base section 4, is shown in the form of a spider frame formed in one piece and composed of four similar equally-spaced arms radiating from a common center. These four base sections are placed together to form a hollow square with the ends of the arms that form the sides of the square abutting as shown in Fig. 1, and as the length of each base section arm is approximately one half the gage of the intersecting tracks, each side of the square thus formed is approximately equal to the gage of the tracks. The arms of the track sections that project outwardly from the square formed by said sections are arranged to longitudinally fit the inner sides of the track rails 1, 2, below the heads thereof and are firmly and strongly secured thereto by suitable cross bolts, so that each base section will have one outwardly projecting arm arranged longitudinally of and rigidly secured to a rail 1, and its other outwardly extending arm arranged longitudinally of and rigidly secured to a rail 2.

The base arms forming the opposite sides of the square between and in general continuation of the rails 1, have the rail lengths 10, fitted longitudinally to the outer sides thereof and rigidly secured thereto by cross bolts 5, so that said base arms or sides fit the inner sides of said rail lengths, and project inwardly and laterally therefrom below the rail heads and in direct line with the base arms to which the rails 1, are secured.

The other opposite sides of the square between the rails 2, correspondingly receive and are secured by bolts 6, to the rail lengths 20, and are arranged with respect thereto and with respect to the rails 2, as described in connection with the rail lengths 10.

If so desired, four rail lengths 7, abutting at their ends can be arranged along the inner sides of the square formed by the base sections and rigidly secured thereto by the cross bolts 5, 6, to aid in rendering the structure rigid and in securing the base sections together and also to serve as guard rails for the wheels while passing along the crossing over the rail sections 10, 20. Guard and bracing rail lengths 8, can be also arranged and secured along the inner sides of the base arms projecting beyond the square formed by the base, so that said lengths 8, will lie along opposite sides of said base arms from the track rails 1, 2. The heads of the various track rails and rail lengths lap over the top edges of the base and extend above the plane of the top surface of the base, while the base provides portions extending laterally beyond the rail and rail length heads and longitudinally thereof in the vertical planes in which the wheel flanges travel. These longitudinal intermediate portions of the base are formed with wheel flange treads or bearing surfaces $a$, on which the wheel flanges ride or travel and by which the wheel rims or treads are lifted from contact with the rails in passing over the crossing.

In the example illustrated, each base section has the longitudinal top surfaces of its arms formed with the longitudinal intermediate treads $a$, inclining downwardly from the center of the section so that in the assembled crossing these treads $a$, are exposed between the rails 1 and 8, 2 and 8, 10 and 7, 20 and 7, and form continuous wheel flange bearing treads along each track and over the crossing. These treads $a$, are so arranged that when the wheels approach the crossing the flanges thereof will engage said treads and travel up the inclines thereof, thereby lifting the wheel treads from the rails over the breaks between the rails and providing a smooth or unbroken passage of the wheels over the crossing.

It is evident that various changes and modifications might be resorted to without departing from the spirit and scope of my invention and hence I do not wish to limit myself to the exact disclosure hereof.

What I claim is:—

1. A railroad crossing comprising track and guard rail lengths and a base fitted and secured therebetween and comprising four similar abutting sections secured together by said rail lengths and each having four similar arms radiating from a common center and formed with continuous top wheel flange treads.

2. A railroad crossing comprising a base composed of a series of similar interchangeable sections, each comprising arms radiating from a common center and having longitudinal inclined top wheel flange treads, and rail lengths longitudinally fitting the side edges of said base and having their heads projecting above the same.

3. A railroad crossing comprising track rail lengths, a base longitudinally fitting said rail lengths and arranged beside the same, and cross bolts through the rail webs and base and securing the base and rail lengths together, said base consisting of four interchangeable sections each having diverging arms provided along the top edges with wheel flange treads, arranged beside and parallel with the rail heads, substantially as described.

In testimony whereof I affix my signature in presence of two witnesses.

ROBERT H. PILCHER.

Witnesses:
E. S. McDONALD,
ROSA VOELCKER.

---

Copies of this patent may be obtained for five cents each, by addressing the "Commissioner of Patents, Washington, D. C."